I. B. HAVOURD.
INCUBATOR TEMPERATURE REGULATOR.
APPLICATION FILED SEPT. 16, 1909.

1,001,758.

Patented Aug. 29, 1911.
2 SHEETS—SHEET 1.

Witnesses

Inventor
Irvin B. Havourd.
By C. A. Snow & Co.
Attorneys

I. B. HAVOURD.
INCUBATOR TEMPERATURE REGULATOR.
APPLICATION FILED SEPT. 16, 1909.
1,001,758.
Patented Aug. 29, 1911.
2 SHEETS—SHEET 2.
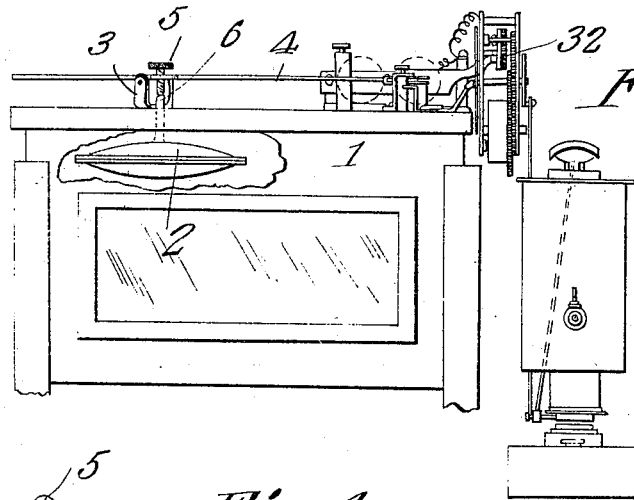
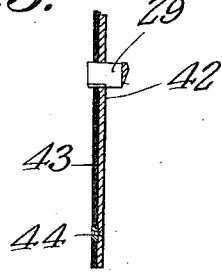
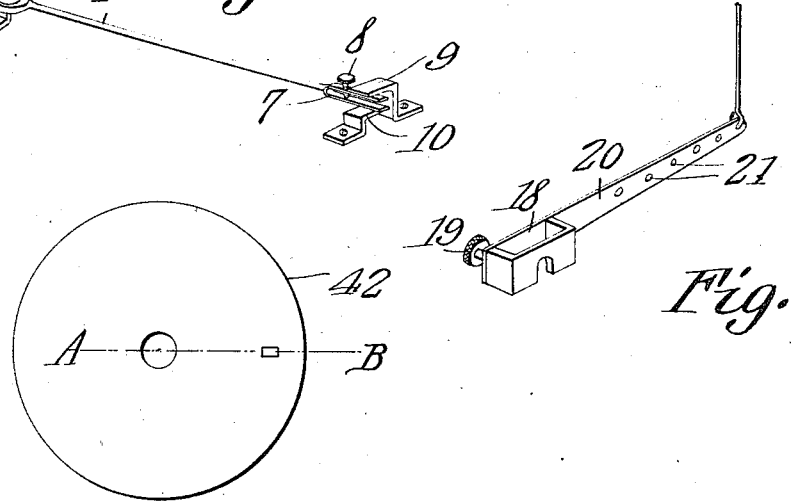
Witnesses
E. W. Stewart
F. T. Chapman
Inventor
Irvin B. Havourd.
By C. A. Snow & Co.
Attorneys

UNITED STATES PATENT OFFICE.

IRVIN B. HAVOURD, OF ELKHART, INDIANA.

INCUBATOR-TEMPERATURE REGULATOR.

1,001,758.  Specification of Letters Patent.   Patented Aug. 29, 1911.

Application filed September 16, 1909. Serial No. 518,064.

*To all whom it may concern:*

Be it known that I, IRVIN B. HAVOURD, a citizen of the United States, residing at Elkhart, in the county of Elkhart and State of Indiana, have invented a new and useful Incubator-Temperature Regulator, of which the following is a specification.

This invention has reference to improvements in temperature regulators for incubators whereby the temperature may be maintained sensibly uniform in spite of great changes in temperature exterior to the incubator. For this purpose there is provided a source of heat for the interior of the incubator, although the source itself may be located exterior to the incubator, and means highly sensitive to minute temperature changes within the incubator are provided whereby the source of heat may be regulated promptly as the heat within the incubator varies and in accordance with such variations.

While the regulation of the heat source is dependent upon temperature variations within the incubator, the structure forming the subject matter of the present invention is actively sensitive to such slight heat variations that there is no sensible variation in the internal temperature of the incubator under the widest daily variations of the temperature of the atmosphere external to the incubator.

The invention will be best understood from a consideration of the following detail description taken in connection with the accompanying drawings forming a part of this specification, in which drawings—

Figure 1:
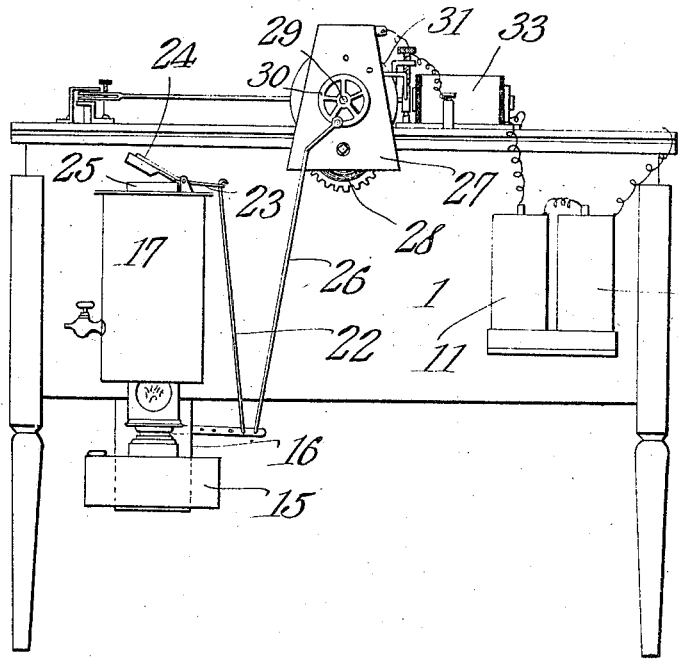
Figure 2:
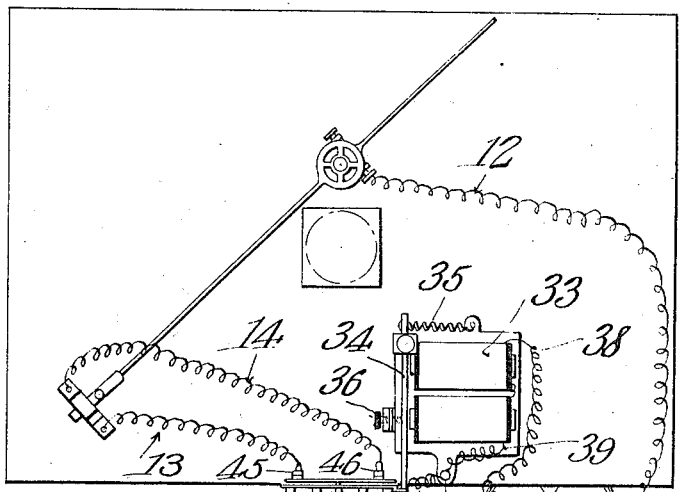

Figure 1 is an elevation of an incubator equipped with the present invention. Fig. 2 is a plan view of the structure shown in Fig. 1 with electric circuits diagrammatically displayed. Fig. 3 is a view of the incubator at right angles to that of Fig. 1 with some parts broken away and other parts omitted. Fig. 4 is a detail perspective view of a contact lever used in connection with the present invention. Fig. 5 is a detail perspective view of a portion of the structure embodied in the present invention. Fig. 6 is a view of an insulated contact disk. Fig. 7 is a section through a portion of the structure of Fig. 6 on the line A—B of said figure.

Referring to the drawings, there is shown an incubator body 1, which, so far as the present invention is concerned, may be of any suitable construction, and therefore the internal construction of the incubator is not shown. Located within the incubator is a thermostat 2, but this is only illustratively shown without regard to any particular or preferred form of thermostat and the showing of such thermostat in the drawings is to be taken largely as diagrammatic or schematic.

On top of the incubator body there is mounted a bracket yoke 3 in which is pivoted a lever 4 carrying a set screw 5 which may be engaged by a stem 6 projecting from the thermostat 2 so that the lever 4 will be moved by the expansion and contraction of the thermostat. The set or adjusting screw 5 is placed close to the pivot point of the lever 4 while the longer arm of the lever is purposely made many times the length of the short arm so that minute movements of the thermostat will be converted into extensive movements of the free end of the long arm of the lever. This free end of the long arm of the lever carries a fork 7 which may consist of two members connected together at points where they join the lever arm and these members may be caused to move one toward the other or one from the other by a suitable adjusting screw 8.

In the path of one of the members of the fork 7 is a contact plate 9 and in the path of the other member of the fork 7 is a contact plate 10, these two contact plates being mounted on top of the incubator and one overriding the other but spaced therefrom so that the fork 7 may have a limited extent of travel between the adjacent faces of the two contact plates before engaging either.

Mounted on the body 1 of the incubator at any convenient point is a battery 11 of any suitable type such for instance as the form of battery known as dry battery, or this battery may be of any other type or may be replaced by connections to any suitable current source either local to the incubator or remote therefrom as may be desired. One side of the battery 11, taking this battery as typical of any suitable current source, is connected by a conductor 12 to the bracket 3 and the contact plates 9 and 10 are connected to respective conductors 13 and 14, the purpose of which will presently appear.

The present invention is not necessarily limited to any particular source of heat for maintaining the internal temperature of the incubator. It is preferred however, because of the ease of control, to employ a lamp 15 as the source of heat, and to mount the same exterior to the incubator, usually upon a bracket 16. The heat furnished by the flame of the lamp is caused to pass through a drum 17 surrounding or forming part of the chimney of the lamp. The drum 17 in the structure shown in the drawings is assumed to be a water jacket communicating with heat radiating parts within the incubator so that the heat generated by the lamp may be uniformly distributed to the eggs within the incubator.

There is provided a clamp 18 which may be attached to the wick actuating portion of the lamp, as for instance to the button at the end of the wick arbor, by means of a set screw 19 and this bracket has projecting from one side thereof an arm 20 provided with a series of spaced holes 21 in any one of which may be secured a link 22, the other end of which is made fast to an arm 23 projecting from one side of the pivot point of a pivoted cap 24 designed to move to and from the upper end of the lamp chimney 25 whether this chimney be a separate structure or be formed by the inner wall of the jacket 17. The arm 20 may also receive by any one of the holes 21 one end of a link 26, the other end of which is disposed as will be hereinafter described.

Made fast to the body of the incubator 1, preferably near the top thereof is a clock movement 27 designed to be actuated by a spring 28 as is common in clock movements. This clock movement has an arbor 29 carrying a crank wheel 30 on which is a pin to which is connected the end of the link 26 remote from that connected to the arm 20. The clock movement is so constructed, as will hereinafter appear, that the crank wheel or disk 30 is moved one-half a revolution at a time under the impulse of the spring 28 and the connecting gear train and this movement of the crank wheel or disk 30 is sufficient to move the arm 20 a distance which will cause the wick of the lamp 15 to be turned up to increase the flame or turned down to diminish the flame.

The clock movement may be variously constructed as may be desired, but should be so designed that the crank disk, or wheel 30 is moved but half a revolution at a time and is arrested at the completion of each half revolution. To cause an even movement of the gear train any suitable governing device, either pneumatic or centrifugal, may be employed.

One of the gear wheels of the gear train, such wheel being indicated at 31, is provided with stop pins 32, which stop pins may be disposed at diametrically opposite points if the movement of the gear wheel 31 is the same as that of the crank disk 30.

Mounted on top of the incubator body is an electromagnet 33 having an armature lever 34 under the normal control of a spring 35 and limited in movement by said spring by means of a back stop set screw 36. The free end of the armature lever is provided with a finger 37 normally in the path of the pins 32 on the gear wheel 31. That end of the battery 11 remote from that connected to the conductor 12 is connected by a conductor 38 to one side of the magnet 33 while the other side of the magnet is connected by a conductor 39 to a binding post 40 and the latter is connected by a conductor 41 to the frame of the clock movement 27.

Mounted on the arbor 29 of the clock movement is a disk 42 located at the end of the arbor remote from that carrying the crank wheel 30. This disk has one face covered with insulating material 43 and at one point the disk carries a stud or projection 44 projecting through the insulating face 43 and there exposed. Mounted on the top of the incubator body are two brushes 45 and 46 having their free ends engaging the insulating face 43 of the disk 42 so as to be engaged successively by the conducting stud 44 exposed through the said insulating face. The brush 45 is connected to the conductor 13 and the brush 46 is connected to the conductor 14.

Let it be assumed that the incubator is in operation and further let it be assumed that the temperature within the incubator is rising. The thermostat 2 will respond and act on the lever 4. Let it be further assumed that the action of the thermostat on a rise of temperature is such as to elevate the free end of the lever 4 and bring the upper arm of the member 7 into engagement with the contact 9. Let it also be assumed that the brush 45 is at this time on the stud 44 of the disk 42. There is now established a circuit from the battery 11 by the conductor 12 to the lever 4, thence by the upper arm of the member 7 to the contact plate 9, thence by the conductor 13 to the brush 45, thence by the stud 44 to the disk 42, thence by the frame of the clock movement 27 to the conductors 41 and 39, thence through the coils of the magnet 33 and finally back to the battery by way of the conductor 38. This will cause the energization of the magnet 33 and the attraction of the armature 34 thus moving the finger 37 out of the path of the stud 32 on the wheel 31 then in engagement with the said finger 37. The reaction of the spring 28 will cause a rotative movement of the arbor 29 and also of the wheel 31, the speed of this movement being controlled by the governor of the clock movement. The arrangement is such that as soon as the clock movement begins its action, the stud 44 is carried away from the brush 45 and the circuit is thereby broken so that the magnet 33 is deënergized and the spring 35 will move the armature 34 in a direction to bring the finger 37 in the path of the next pin or stud 32 on the wheel 31 and the clock movement is stopped as soon as the wheel or disk 30 has made half a revolution, the disk 42 participating in this movement of the clockwork and the conducting stud 44 is in contact with the brush 46 when the motion of the clock movement ceases.

If it be assumed that the parts are in the position shown in Fig. 1 as the temperature rises then the movement of the disk or wheel 30 has been in a direction to lift the outer end of the arm 20 thus causing the cap 24 to move from the upper end of the chimney 25 and the wick of the lamp 15 to be lowered a distance agreeable to the effective length of the arm 20, this effective length being determined by the one of the perforations or holes 21 into which the link 26 is secured. Because of the reduction of the flame in the lamp 15 and the lifting up of the cover 24 there is a reduction of the heat furnished by the lamp and a consequent cooling of the interior of the incubator. The thermostat 2 will respond to this reduction of temperature and the lever 4 will be lowered until the lower arm of the member 7 is in engagement with the contact plate 10 and the circuit is established through the conductor 14 and brush 46 in the same manner in which it was established through the conductor 13 and brush 45 and the magnet is again energized and the clock movement released as before to cause a restoration of the flame of the lamp to its original condition and the lowering of the cap 24.

Because of the great length of the lever 4 as to its longer arm with relation to its shorter arm, a very small movement of the thermostat will cause the closing of the circuit on one or the other of the contact plates 9 and 10, and the relative movement of the arms of the lever 4 may be further modified by adjusting the distance between the two legs of the member 7 by means of the screw 8.

The position of the arm 20 with relation to the wick-controlling arbor of the lamp may be readily adjusted at any time by means of the set screw 19 and the degree of movement of the wick may be controlled as desired by the position of the link 26 with relation to said arm 20. Because of these several adjustments, the temperature of the interior of the incubator may be determined with great accuracy and having been once determined it will be maintained so uniformly that the temperature changes within the incubator are inappreciable.

The device is so sensitive in action that a change in the external temperature of 75° in twenty-four hours will not affect the internal temperature of the incubator to a noticeable degree. This close regulation is obtained after the regulating means has been properly set and without any further adjusting whatsoever of the parts.

What is claimed is:

The combination with a combined damper and wick moving member, of a motor, means operated by the motor for successively raising and lowering said member to correspondingly move the damper and wick, projecting devices movable with the motor, a stop extending into the path of said devices for holding the moving member at either limit of its movement, a disk of insulating material actuated by the motor, a contact upon the disk, an electrical connection between said contact and a source of electricity, said connection including an electromagnet, means under the control of the electromagnet for shifting the stop device to release the projection and the motor, a thermostatically controlled lever, an electrical connection between said lever and the source of electricity, insulated contacts at the limits of the movement of the lever, and brushes contacting with diametrically opposed portions of the disk and in the path of the contact thereon, said brushes being electrically connected to the respective contacts adjacent the lever.

In testimony that I claim the foregoing as my own, I have hereto affixed my signature in the presence of two witnesses.

IRVIN B. HAVOURD.

Witnesses:
EMIL V. ANDERSON,
EARL C. RICE.